No. 883,623. PATENTED MAR. 31, 1908.
O. H. CHANDLER.
DIPPER HANDLE.
APPLICATION FILED JUNE 5, 1907.
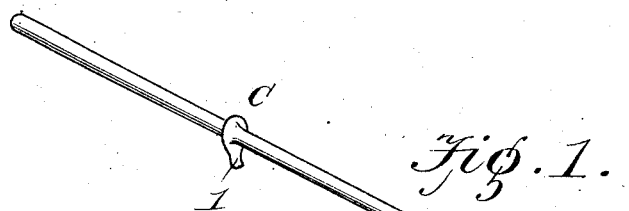
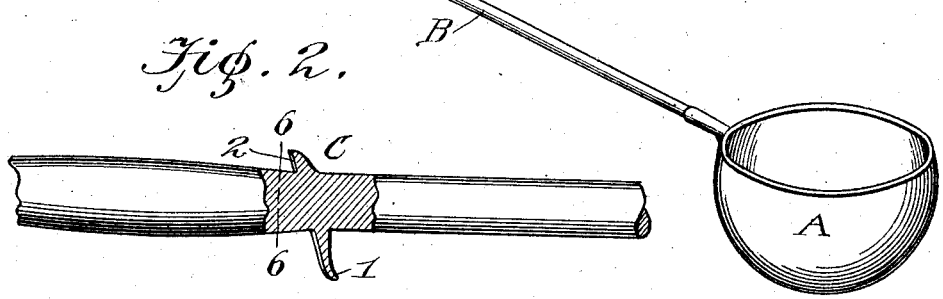
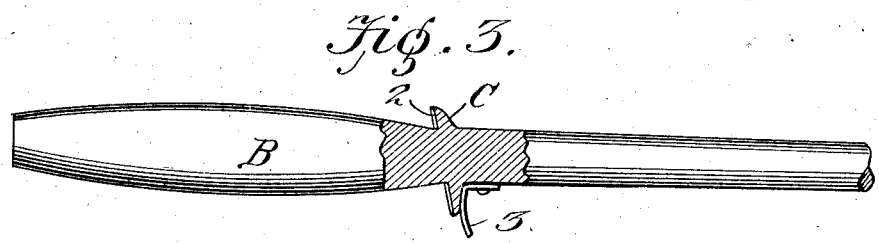
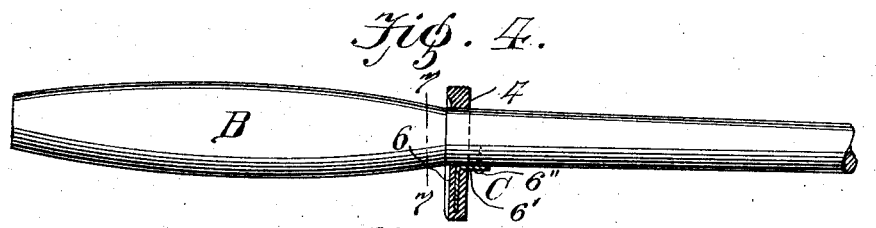
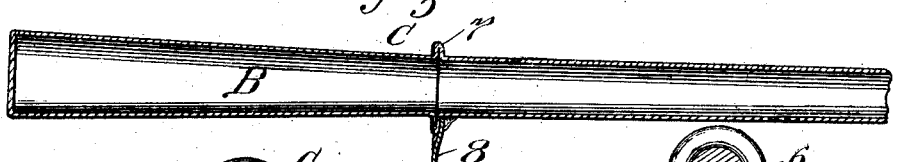
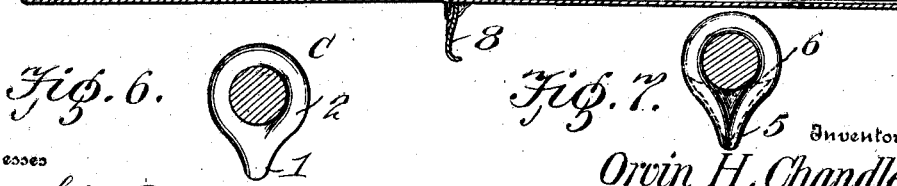
Witnesses
Frank B. Hoffman
C. Brodway
Inventor
Orvin H. Chandler
By
Victor J. Evans
Attorney

UNITED STATES PATENT OFFICE.

ORVIN H. CHANDLER, OF CLINTON, SOUTH CAROLINA, ASSIGNOR OF ONE-HALF TO THOMAS L. W. BAILEY, OF CLINTON, SOUTH CAROLINA.

DIPPER-HANDLE.

No. 883,623.              Specification of Letters Patent.          Patented March 31, 1908.

Application filed June 5, 1907. Serial No. 377,373.

*To all whom it may concern:*

Be it known that I, ORVIN H. CHANDLER, a citizen of the United States, residing at Clinton, in the county of Laurens and State of South Carolina, have invented new and useful Improvements in Dipper-Handles, of which the following is a specification.

This invention relates to a handle for a dipper or other cooking utensils of that type provided with a guard whereby water or other liquids is prevented from flowing down the handle into the vessel containing the dipper.

The invention has for one of its objects to improve and simplify the construction of devices of this character so as to be comparatively easy and inexpensive to manufacture and highly effective in use.

A further object of the invention is the provision of a guard for a dipper handle or the like which has the double purpose of acting as a holder in preventing the dipper from slipping into the vessel with which it is used and to shed off the water or other liquid that runs off from the wet hand of the user so as to pass down the outside instead of inside the vessel.

With these objects and others in view, as will appear as the description proceeds, the invention comprises the various novel features of construction and arrangement of parts, which will be more fully described hereinafter and set forth with particularity in the claim appended hereto.

In the accompanying drawing, which illustrates certain of the embodiments of the invention:—Figure 1 is a perspective view of a ladle equipped with the improved handle. Fig. 2 is an enlarged fragmentary view of the handle, partly in section. Fig. 3 is a similar view, showing a modified form. Fig. 4 is a further modification in which the guard is in the nature of an attachment. Fig. 5 is a still further modification. Fig. 6 is a transverse section on line 6—6 of Fig. 2. Fig. 7 is a similar view on line 7—7 of Fig. 4.

Referring to the drawing, A designates a ladle or dipper that is equipped with a handle B which may be made of wood, metal or any other suitable material and of any desired form. At a suitable point inwardly from the free end of the handle is a guard C that extends entirely around the handle and has its under side shaped into a lip or spout 1. Preferably the guard is inclined to aline passing transversely through the handle and the side nearest to the part of the handle gripped in the hand is hollowed out so as to form a concavity or trough, as indicated at 2 in Figs. 2 and 6, which trough runs into the spout 1. By prolonging the spout as shown the same acts as a hook, whereby the ladle can be held in a vessel without slipping entirely into the same. By providing a handle with a guard in this manner any water or other liquid that runs off the hand of the user will be shed from the handle by collecting in the trough of the guard and running out of the spout 1. Since the spout engages on the outside of the vessel, it is obvious that the water will not run into the latter.

In the modification shown in Fig. 3, the wooden or other handle is cut or molded with a guard in which the spout or lip is eliminated and in its stead a hook 3 is provided that is arranged behind the guard at the under side of the handle.

The guard may be formed as an attachment so that it can be used in connection on handles of dippers or other utensils already in use. This attachment comprises preferably a rubber ring 4 that has its front side concaved to collect the water, which concavity discharges into a spout 5, as shown in Fig. 7. If desired, a metal reinforce 6, as shown in Fig. 4 and by dotted lines in Fig. 7 may be employed in connection with the ring and preferably embedded therein. The reinforce has a lug 6' which receives a tack 6'' to secure the attachment to the handle.

When the handle is made of metal the guard can be formed by making an outwardly extending circumferential crease as indicated by 7, in Fig. 5. In connection therewith is a piece of metal 8 soldered or otherwise secured behind the guard towards the bottom of the handle, which metal piece is formed into a combined hook and spout, and as indicated has the same function as the spout, one as shown in Fig. 1.

From the foregoing description, taken in connection with the accompanying drawing, the advantages of the construction and method of operation will be readily understood to those skilled in the art to which the invention appertains, and while I have described the principle of operation of the invention together with the device which I now consider to be the best embodiment thereof, I desire to have it understood that the device shown is merely illustrative and that such changes may be made when desired as are within the scope of the claim.

Having thus described the invention, what is claimed, is:—

A utensil handle, an annular guard thereon having a trough on the side presented to the gripping portion of the handle, and a spout by which the liquid is discharged from the trough, said spout projecting outwardly from the handle to constitute means for holding the utensil in a vessel.

In testimony whereof, I affix my signature in presence of two witnesses.

ORVIN H. CHANDLER.

Witnesses:
    J. A. BAILEY,
    W. E. DILLARD.